G. MARCONI.
TRANSMITTING APPARATUS FOR WIRELESS TELEGRAPHY.
APPLICATION FILED JULY 15, 1910.
997,308.
Patented July 11, 1911.
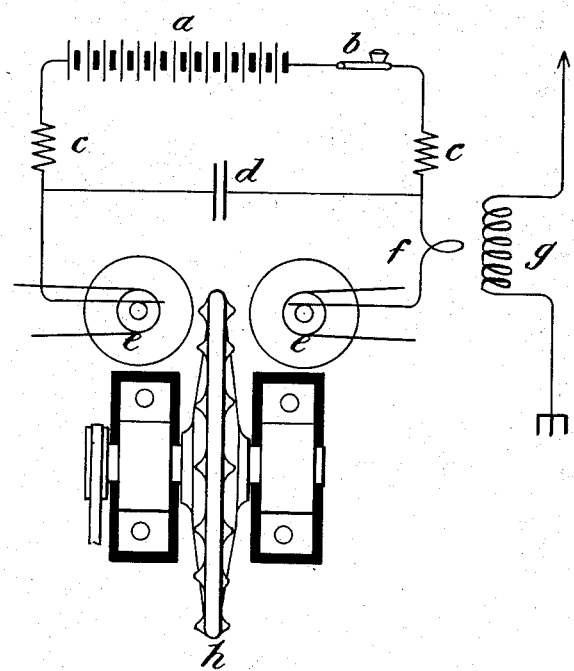
Witnesses
Inventor
Guglielmo Marconi
by Betts Sheffield Bentley Betts
Attorneys.

UNITED STATES PATENT OFFICE.

GUGLIELMO MARCONI, OF LONDON, ENGLAND, ASSIGNOR TO MARCONI WIRELESS TELEGRAPH COMPANY OF AMERICA, OF NEW YORK, N. Y., A CORPORATION OF NEW JERSEY.

TRANSMITTING APPARATUS FOR WIRELESS TELEGRAPHY.

997,308. Specification of Letters Patent. Patented July 11, 1911.

Application filed July 15, 1910. Serial No. 572,070.

*To all whom it may concern:*

Be it known that I, GUGLIELMO MARCONI, LL. D., D. Sc., a subject of the King of Italy, residing at Watergate House, Adelphi, London, England, have invented new and useful Improvements in Transmitting Apparatus for Wireless Telegraphy, of which the following is a specification.

It has before been proposed to employ a transmitter in which the gap between two terminals of the oscillation circuit is more or less bridged at regular intervals by means of bridging pieces in very rapid movement, these bridging pieces preferably consisting of studs fixed to a rapidly revolving disk. Now it is found that it is very advantageous to obtain a greater number of discharges per second, and this can be done by increasing the number of pairs of studs on the disk and the speed of rotation of the disk. A difficulty however arises, for at the occurrence of each discharge the condenser is shunted and when the discharge stops the shunt is broken and the condenser is charged by the generator with oscillations, the time period of which is dependent upon the whole inductance of the circuit including that of the alternator or transformer if an alternating current generator be employed or of the dynamo armature if a continuous current generator be employed. But to reduce this time period to the very small fraction of a second which is now found to be desirable it is necessary such inductance should be less than that of any known dynamo.

According to this invention therefore and in order to reduce the inductance of the charging circuit the dynamo is replaced by a battery of low resistance having a sufficiently large number of cells connected in series to give the necessary E. M. F. In circuit with the battery is placed an inductance of suitable value to satisfy the above stated conditions. Preferably a secondary battery is employed which is kept constantly charged by a continuous current dynamo. The diagram shows such a transmitter, *a* being the battery connected through a sending key *b* and inductances *c* to a condenser *d* which is connected to slowly rotating disks *e* one of the connections including the primary of the inductive coupling *f* to the aerial *g*.

*h* is a disk which can be very rapidly rotated so that the studs *g* upon it bridge at very short intervals the gap between the disks *e*.

What I claim is:—

1. In a transmitter for wireless telegraphy, the combination in an oscillation circuit of a battery of low resistance, moving terminals therefor, arranged so that a gap is left between them, bridging pieces adapted to bridge such gap, and means for rapidly moving the bridging pieces past the gap.

2. In a transmitter for wireless telegraphy, the combination in an oscillation circuit of a battery of low resistance, moving terminals therefor, arranged so that a gap is left between them, an insulated disk, studs located at regular intervals on said disk and adapted to bridge the gap, and means for rapidly rotating the disk.

3. In a transmitter for wireless telegraphy, the combination of a battery of low resistance, a condenser adapted to be charged thereby, a pair of terminals connected to the condenser, an inductance in series with the condenser and terminals, means for rotating the terminals, an insulated disk, studs located at regular intervals thereupon and adapted to bridge the gap between the terminals, and means for rapidly rotating the disk.

4. In a transmitter for wireless telegraphy, the combination of a battery of low resistance, a condenser adapted to be charged thereby, a pair of terminals connected to the condenser, an inductance in series with the condenser and terminals, means for rotating the terminals and means operating at intervals bearing an integral ratio to the electrical time period of the circuit containing the condenser and battery for bridging the gap between the terminals.

5. In a transmitter for wireless telegraphy, the combination of a battery of low resistance, a condenser adapted to be charged thereby, a pair of terminals connected to the condenser, an inductance in series with the condenser and terminals, means for rotating the terminals, an insulated disk having studs located at regular intervals upon it and adapted to bridge the gap between the terminals, and means for
5 rapidly rotating the disk so as to bridge the gap between the terminals at intervals bearing an integral ratio to the electrical time period of the circuit containing the condenser and the battery.

GUGLIELMO MARCONI.

Witnesses:
E. P. TURNBULL,
J. ST. VINCENT PLETTS.